(12) United States Patent
Poon et al.

(10) Patent No.: US 10,133,728 B2
(45) Date of Patent: Nov. 20, 2018

(54) SEMANTIC PARSING FOR COMPLEX KNOWLEDGE EXTRACTION

(71) Applicant: Microsoft Technology Licensing, LLC, Redmond, WA (US)

(72) Inventors: Hoifung Poon, Bellevue, WA (US); Kristina Toutanova, Redmond, WA (US); Ankur P. Parikh, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 14/664,760

(22) Filed: Mar. 20, 2015

(65) Prior Publication Data

US 2016/0275073 A1 Sep. 22, 2016

(51) Int. Cl.
*G06F 17/27* (2006.01)

(52) U.S. Cl.
CPC ........ *G06F 17/2785* (2013.01); *G06F 17/271* (2013.01)

(58) Field of Classification Search
CPC ...................................................... G10L 15/18
USPC ........................ 704/9, 910; 707/802; 717/151
See application file for complete search history.

(56) References Cited

U.S. PATENT DOCUMENTS

| | | | | | |
|---|---|---|---|---|---|
| 5,060,155 | A * | 10/1991 | van Zuijlen | ........ | G06F 17/2705 704/9 |
| 5,161,216 | A * | 11/1992 | Reps | .......................... | G06F 8/75 717/151 |
| 6,182,028 | B1 * | 1/2001 | Karaali | ................... | G10L 15/18 704/10 |
| 6,950,753 | B1 * | 9/2005 | Rzhetsky | ................ | G06F 19/12 702/19 |
| 7,085,708 | B2 * | 8/2006 | Manson | ................ | G06F 17/271 704/1 |
| 8,315,849 | B1 * | 11/2012 | Gattani | ................... | G06F 17/28 704/10 |
| 8,856,190 | B2 * | 10/2014 | Grechanik | ........ | G06F 17/30908 707/802 |
| 2001/0011271 | A1 * | 8/2001 | Takahashi | ........... | G06F 17/3061 |
| 2003/0204515 | A1 * | 10/2003 | Shadmon | ............ | G06F 17/3061 |

(Continued)

FOREIGN PATENT DOCUMENTS

CN 101937430 A 1/2011

OTHER PUBLICATIONS

Artzi et al., "Bootstrapping Semantic Parsers from Conversations", in the Proceedings of the 2011 Conference on Empirical Methods in Natural Language Processing, Jul. 2011, pp. 421-432.

(Continued)

*Primary Examiner* — Michael Colucci

(57) ABSTRACT

The system that performs semantic parsing may automatically extract complex information from databases. Complex information may comprise nested event structures. In one example process, a processor may receive unannotated text and may access a natural-language database that includes nested events. The processor, in performing semantic parsing, may automatically generate syntactic trees that include annotations that represent the semantic information. In particular, the natural-language sentences and the database include nested event structures.

20 Claims, 5 Drawing Sheets

| | ID | TYPE | CAUSE | THEME | TRIGGER |
|---|---|---|---|---|---|
| Row 1 | T1 | PROTEIN | - | - | BCL |
| Row 2 | T2 | PROTEIN | - | - | RFLAT |
| Row 3 | T3 | PROTEIN | - | - | IL-10 |
| Row 4 | E1 | POS-REG | T1 | E2 | STIMULATES |
| Row 5 | E2 | NEG-REG | T3 | T2 | INHIBITION |

500

(56) References Cited

U.S. PATENT DOCUMENTS

| | | | | |
|---|---|---|---|---|
| 2004/0068677 | A1* | 4/2004 | Briskey | G06F 11/366 |
| | | | | 714/38.14 |
| 2007/0118357 | A1* | 5/2007 | Kasravi | G06F 17/273 |
| | | | | 704/10 |
| 2008/0154926 | A1* | 6/2008 | Newman | G06Q 10/107 |
| 2010/0211572 | A1* | 8/2010 | Beyer | G06F 17/30864 |
| | | | | 707/742 |
| 2013/0268258 | A1* | 10/2013 | Patrudu | G06F 17/28 |
| | | | | 704/2 |
| 2013/0325436 | A1* | 12/2013 | Wang | G06F 17/2715 |
| | | | | 704/9 |
| 2015/0142443 | A1* | 5/2015 | Hwang | G06F 17/27 |
| | | | | 704/257 |

OTHER PUBLICATIONS

Artzi et al., "Weakly Supervised Learning of Semantic Parsers for Mapping Instructions to Actions", Transactions of the Association for Computation Linguistics, 2013, pp. 49-62.

Berg-Kirkpatrick et al., "Painless Unsupervised Learning with Features", in the Proceedings of the 2010 Annual Conference of the North American Chapte of the ACL: Human Language Technologies, Jun. 2010, pp. 582-590.

Bjorne, "Biomedical Event Extraction with Machine Learning," in TUCS Dissertations, No. 178, Jul. 2014, 121 pages.

Bjorne et al., "Extracting Complex Biological Events with Rich Graph-Based Feature Sets", in the Proceedings of the Workshop on BioMLP: Shared Task, Jun. 2009, pp. 10-18.

Bjorne et al., "Generalizing Biomedical Event Extraction," in the Proceedings of the BioNLP Shared Task 2011 Workshop, Jun. 24, 2011, pp. 183-191.

Cerami et al., "Pathway Commons, a web resource for biological pathway data", in the Jounal of Nucleic Acids Research, vol. 39 (Database Issue), Nov. 10, 2010, 6 pages.

Chen et al., "Learning to Interpret Natural Language Navigation Instructions from Observations", in the Journal of Artificial Intelligence Research, No. 37, 2010, 7 pages.

Clarke et al., "Driving Semantic Parsing from the World's Response", in the Proceedings of the Fourteenth Conference on Computational Natural Language Learning, Jul. 2010, pp. 18-27.

Craven et al., "Constructing Biological Knowledge Bases by Extracting Information from Text Sources", in the Proceedings of the Seventh International Conference on Intelligent Systems for Molecular Biology, Aug. 6, 1999, 10 pages.

De Marneffe et al., "Generating Typed Dependency Parses from Phrase Structure Parses", in the Proceedings of the Fifth International Conference on Language Resources and Evaluation, vol. 6, No. 2006, May 2006, 6 pages.

Haghighi et al., "Prototype-Driven Learning for Sequence Models", in the Proceedings of the Human Language Technology Conference of the North American Chapter of the ACL, Jun. 2006, pp. 320-327.

Haiyan et al. "Automatic Knowledge Extraction from Chinese Natural Language Documents," in the Journal of Computer Research and Development, No. 4, 2013, 10 pages.

Han et al., "Knowledge Discovery in Databases: An Attribute-Oriented Approach", in the Proceedings of teh 18th International Conference on Very Large Data Bases, Aug. 23, 1992, 14 pages.

Hiong et al., "Nested Event Model", retrieved on Mar. 17, 2015, available at <<http://www.researchgate.net/publication/267511267_Nested_Event_Model/links/54517a020cf285a067c68b94>>.

Hoffman et al., "Knowledge-Based Weak Supervision for Information Extraction of Overlapping Relations", in the Proceedings of the 49th Annual Meeting of the Association for Computational Linguistics, Jun. 2011, pp. 541-550.

Kanehisa, "The KEGG Database" 'In Silico' Simulation of Biological Processes: in the Proceedings of the Novartis Foundation Symposium, vol. 247, Nov. 2002, 261 pages.

Kim et al., "Overview of BioNLP'09 Shared Task on Event Extraction", in the Proceedings of the Workshop on Current Trends in Biomedical Natural language Processing: Shared Task, Jun. 5, 2009, 9 pages.

Krishnamurthy et al., "Weakly Supervised Training of Semantic Parsers", in the Proceedings of the 2012 Joint Conference on Empirical Methods in Natural Language Processing and Computational Natural Language Learning, Jul. 2012, pp. 754-765.

Liang et al., "Learning Dependency-Based Compsitional Semantics", in the Jounal of Computational Linguistics,vol. 39, No. 2, Apr. 2012, 59 pages.

Liu et al., "Approximate Subgraph Matching-Based Literature Mining for Biomedical Events and Relations", in the Journal of PLOS One, vol. 8, No. 4, Apr. 17, 2013, 23 pages.

McClosky et al., "Event Extraction as Dependency Parsing," in the Proceedings of teh 49th Annual Meeting of the Association for Computational Linguistics, Jun. 2011, pp. 1626-1635.

Mintz et al., "Distant supervision for relateion extraction without labeled data," in the Proceedings o fthe 47th Annual Meeting of the ACL and the 4th IJCNLP of the AFNLP, Aug. 2009, pp. 1003-1011.

Mooney, Raymond, "Learning for Semantic Parsing", in the Proceedings of the 8th International Conference of Computational Linguistics and Intelligent Text Processing, Feb. 2007, pp. 311-324.

Pandit et al., "Ontology-guided Extraction of Complex Nested Relationships", in the Proceedings of the 2010 22nd Interational Conference on Tools with Artifical Intelligence, Oct. 27, 2010, pp. 173-178.

Pearl, Judea, "Probabilistic Reasoning in Intelligent Systems: Networks of Plausible Inference", in the Publication of Morgan Kaufmann, Sep. 1998, 40 pages.

Poon et al., "Distant Supervision for Cancer Pathway Extraction from Text," in the Proceedings of the Pacific Symposium on Biocomputing, vol. 20, 2014, 12 pages.

Poon, Hoifung, "Grounded Unsupervised Semantic Parsing", in the Proceedings of the 51st Annual Meeting of the Association for Computational Linguistics, Aug. 2013, pp. 933-943.

Poon et al., "Joint Inference for Knowledge Extraction from Biomedical Literature", in the Proceedings of the 2010 Annual Conference of the North American Chapter of the ACL: Human Language Technologies, Jun. 2010, pp. 813-821.

Poon et al., "Unsupervised Ontology Induction from Text", in the Proceedings of the 48th Annual Meeting of the Association for Computational Linguistics, Jul. 11, 2010, 10 pages.

Poon et al., "Unsupervised Semantic Parsing", in the Proceedings of the 2009 Conference on Empirical Methods in Natural Language Processing, Aug. 2009, 10 pages.

Quirk et al., "MSR SPLAT, a language analysis toolkit", in the Proceedings of the NAACL-HLT 2012: Demonstration Session, Jun. 2012, pp. 21-24.

Quirk etl al., "MSR-NLP Entry in BioNLP Shared Task 2011", in the Proceedings of the BioNLP Shared Task 2011 Workshop, Jun. 2011, pp. 155-163.

Riedel et al., "A Markov Logic Approach to Bio-Molecular Event Extraction", in the Proceedings of the Workshop on BioNLP: Shared Task, Jun. 2009, pp. 41-49.

Riedel et al., "Fast and Robust Joint Models for Biomedical Event Extraction", in the Proceedings of the 2011 Conference on Empirical Methods in Natural Language Processing, Jul. 2011, 12 pages.

Riedel et al., "Modeling Relations and Their Mentions without Labeled Text", in the Proceedings of the 2010 European Conference on Machine Learning and Knowledge Discovery in Databases: Part III, Sep. 20, 2010, 16 pages.

Schaefer et al., "PID: the Pathway Interaction Database", in the Journal of Nucleic Acids Research, vol. 37, Iss. 1, 2008, 9 pages.

Subramanya et al., "Virtual Evidence for Training Speech Recognizers using Partially Labeled Data", in the Proceedings of the Human Language Technologies 2007: The Conference of the North American Chapter of the Association for Computational Linguistics; Companion Volume, Apr. 22, 2007, 4 pages.

Titov et al., "A Bayesian Model for Unsupervised Semantic Parsing", in the Proceedings of the 49th Annual Meeting of the Association for Computational Linguistics, Jun. 2011, pp. 1445-1455.

(56) References Cited

OTHER PUBLICATIONS

Zelle et al., "Learning Semantic Grammars with Constructive Inductive Logic Programming", in the Proceedings of the Eleventh National Conference of the American Association for Artificial Intelligence, Jul. 1993, pp. 817-822.

Zettlemoyer et al., "Learning to Map Sentences to Logical Form: Structured Classification with Probabilistic Categorial Grammars", in the Proceedings of the Twenty-First Conference on Uncertainty in Artificial Intelligence, Jul. 2005, 9 pages.

Zettlemoyer et al., "Online Learning of Relaxed CCG Grammars for Parsing to Logical Form", in the Proceedings of the Joint Conference on Empirical Methods in Natural Language Processing and Computational Natural Language Learning, Jun. 2007, 10 pages.

Zhou et al., "Biomedical Relation Extraction: From Binary to Complex," in the Journal of Computational and Mathematical Methods in Medicine, vol. 2014, Aug. 19, 2014, 22 pages.

Zhou et al., "Extracting Interactions between Proteins from Literature", in the Journal of Biomedical Informatics, vol. 41, Iss. 2, Apr. 2008, 32 pages.

Steedman, "The Syntactic Process", The MIT Press, Massachusetts Institute of Technology, Cambridge, Massachusetts, 2001.

\* cited by examiner

|  | ID | TYPE | CAUSE | THEME | TRIGGER |
|---|---|---|---|---|---|
| Row 1 | T1 | PROTEIN | - | - | BCL |
| Row 2 | T2 | PROTEIN | - | - | RFLAT |
| Row 3 | T3 | PROTEIN | - | - | IL-10 |
| Row 4 | E1 | POS-REG | T1 | E2 | STIMULATES |
| Row 5 | E2 | NEG-REG | T3 | T2 | INHIBITION |

SEMANTIC PARSING FOR COMPLEX KNOWLEDGE EXTRACTION

BACKGROUND

Data-driven or supervised machine-learning algorithms are emerging as important tools for information analysis in portable devices, the cloud, and other computing devices. Machine learning involves various algorithms that can automatically learn over time. The foundation of these algorithms is built on mathematics and statistics that can be employed to predict events, classify entities, diagnose problems, and model function approximations. Applications of these algorithms include semantic text analysis, web search, and speech and object recognition, just to name a few examples. Supervised machine-learning algorithms typically operate in two phases: training and testing. In the training phase, typical input examples are used to build decision models that characterize the data. In the testing phase, the learned model is applied to new data instances in order to infer different properties such as relevance and similarity.

SUMMARY

This disclosure describes, in part, techniques and architectures for a system, such as a machine learning system, that performs semantic parsing. The system may automatically extract complex information from databases. In particular, complex information may comprise nested event structures. Databases maybe be created by semantically parsing the text of tens of millions of research journals or articles, among other possibilities. In one example process, a processor may receive unannotated text and may access a database that includes nested events. The processor, in performing semantic parsing, may automatically generate syntactic trees that include annotations that represent natural-language sentences. In particular, the natural-language sentences may be analyzed into nested event structures. Machine learning processes may improve and refine the quality and performance of the semantic parsing.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic (e.g., Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs)), and/or other technique(s) as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
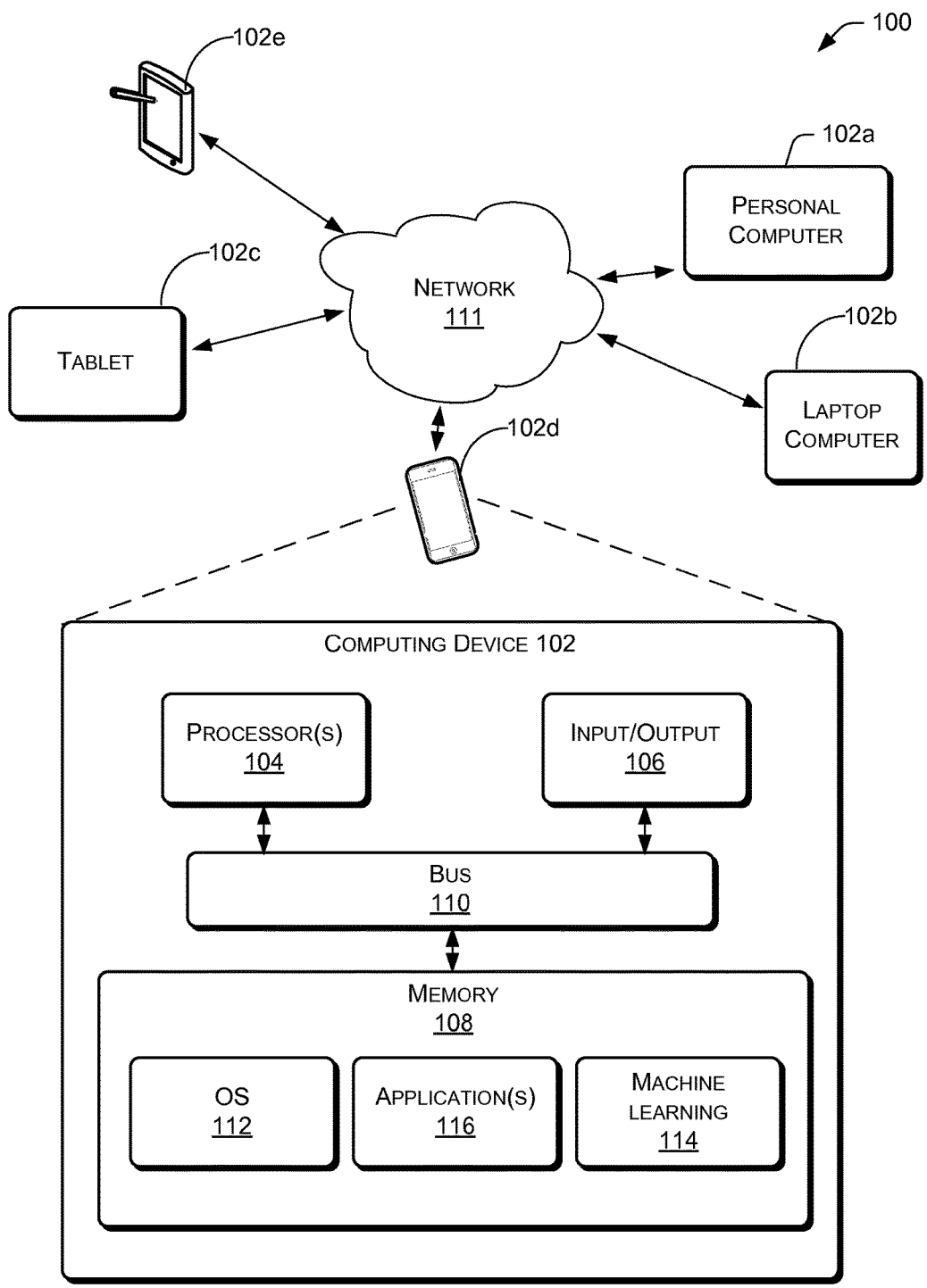
FIG. 1 is a block diagram depicting an example environment in which techniques described herein may be implemented.

Various examples describe techniques and architectures for a system, such as a machine learning system, that performs, among other things, semantic parsing. Such a system may automatically extract complex information from databases. In particular, complex information may comprise nested event structures. Databases maybe be created by semantically parsing text of tens of millions of research journals or articles, among other possibilities. In some example processes, a processor may receive unannotated text and may access a database that includes nested events. The processor, in performing semantic parsing, may automatically generate syntactic trees that include annotations that represent natural-language sentences. In particular, the natural-language sentences may be analyzed into nested event structures.

Generally, semantic parsing involves mapping text into a particular type of representation. For example, such text may comprise natural-language sentences, such as those used in everyday communication (e.g., verbal or written) among people. Mapping text into a representation may be beneficial for a number of reasons. For example, such representations may be readily analyzable or processed by machines. In another example, such representations may be efficiently stored in memory and rapidly retrieved using efficient search techniques.

Supervised approaches for learning a semantic parser generally require annotated examples, which are expensive and time-consuming to generate. As a result, there has been rising interest in learning semantic parsers from indirect supervision. Examples include unsupervised approaches that leverage distributional similarity by recursive clustering, semi-supervised approaches that learn from dialog context, grounded approaches that learn from annotated question-answer pairs, or virtual worlds, just to name a few examples.

Many such applications, however, focus on question answering, where the semantic parser is used to convert natural-language questions into formal queries. In contrast, complex knowledge extraction may represent a relatively untapped application area for semantic parsing. Accordingly, example processes (e.g., GUSPEE, described below) may provide for database queries involving more detailed text patterns, as compared to supervised approaches, and automated semantic parsing of massive amounts of data.

Text with valuable information has been undergoing exponential growth across various document-heavy fields of study, such as medicine, law, finance, consumer products, and business disciplines, just to name a few examples. Research on information extraction abounds, but it tends to focus on classifying simple relations among entities, so is incapable of extracting the prevalent complex knowledge with nested event structures. For example, syntactic trees may be used to represent complex genomic relationships, which may then be applied in gene therapy to find vaccines and other treatments for various diseases. Accordingly, a natural-language sentence may be "BCL stimulates inhibition of RFLAT by IL-10". Traditional information extraction may be content with extracting two binary relation instances (e.g., "BCL stimulates inhibition of RFLAT," and "IL-10 inhibits RFLAT"). However, the sentence also discloses important contextual information, such as "BCL regulates RFLAT by stimulating the inhibitive effect of IL-10," and "the inhibition of RFLAT by IL-10 is controlled by BCL." Such context-specific knowledge may be particularly important in some fields of study, such as translational medicine. For example, a targeted therapy process may try to suppress RFLAT by inducing either BCL or IL-10, without taking into account the interdependency between BCL and IL-10.

Example processes described herein may extract information from sentences. Each such sentence may be represented as a collection of events and listed in an event table. Such processes, which may be performed by software that is executed and continues to run as a background process, for example, may learn so the process of producing event tables may be iterative. Accordingly, the event table(s) may be continuously (or periodically or from time to time) improved or updated. Such processes may run in the background while users perform queries for information searches. Such queries, for example, may be "What regulation events is BCL involved in?" "What causes the inhibition of RFLAT by IL-10?" Such queries may be specified in English (or other natural language) and translated by an algorithm into formal queries, or the queries may be specified directly in a standard database query language like SQL, for example.

Complex knowledge extraction may be framed as a semantic parsing problem, with an event structure represented by a semantic parse. However, annotating example sentences is generally expensive and time-consuming. For example, annotating a corpus may take years and such annotation may have relatively limited scope (e.g., a narrow domain of transcription directed to one of many topics in a field of study). Extensive collections in natural language, however, are available. Additionally, databases of important relationships and events are often available. For example, due in part to a particular importance of biological pathways in understanding diseases and developing drug targets, there are many pathway databases, which may have been manually derived from research papers and scientific articles. Here, automated extraction, particularly complex knowledge extraction, would be beneficial because manual extraction may be incapable of providing complete and up-to-date annotation.

Compared to question answering, knowledge extraction may derive more leverage from databases via distant supervision. For example, databases may be used in a process that automatically annotates natural-language sentences with a relation if the arguments of a known instance co-occur in the sentence. Such a process may be applied to binary relations. For general "n-ary" relations, however, argument co-occurrence may be increasingly rare for larger n. Moreover, it may be relatively difficult to represent and extract complex events from n-ary relations.

In various examples, techniques and architectures involve learning a statistical semantic parser from a database of complex events and unannotated text. In some examples, such machine learning may generalize distant supervision to complex knowledge extraction. For example, latent semantic annotations of sentences may be recovered using an approach called expectation maximization (EM), guided by a structured prior that favors semantic parses containing known events in the database. Such a structured prior may be in the form of virtual evidence, for example.

In various examples, a process, which may be implemented as a machine learning process, may learn from, and extract, complex events from sentences and a database, without requiring textual annotations. Such a process is called grounded semantic parsing for event extraction (GUSPEE).

Some example approaches for event extraction may involve supervised methods that either use a carefully engineered classification pipeline or apply joint inference. For example a dependency-based formulation may be learned from supervised data. Classification approaches may first classify words into event triggers, where distant supervision is not directly applicable. In distant supervision, if two entities are known to have a binary relation in a database, their co-occurrence in a sentence may justify labeling the instance with the relation. This assumption, however, may be incorrect. In some examples, GUSPEE uses latent variables to model uncertainties and to indicate likelihood of incorrectness. Accordingly, GUSPEE may involve latent annotations that are not simple classification decisions, but are nested events.

Distant supervision may be viewed as a special case of the more general paradigm of grounded learning from a database. For example, a database may be used to determine if a candidate semantic parse would yield an annotated answer, whereas distant supervision may use the database to determine if a relation instance is contained therein.

Various examples are described further with reference to FIGS. 1-9.

The environment described below constitutes but one example and is not intended to limit the claims to any one particular operating environment. Other environments may be used without departing from the spirit and scope of the claimed subject matter.

FIG. 1 illustrates an example environment 100 in which example processes involving semantic parsing as described herein can operate. In some examples, the various devices and/or components of environment 100 include a variety of computing devices 102. By way of example and not limitation, computing devices 102 may include devices 102a-102e. Although illustrated as a diverse variety of device types, computing devices 102 can be other device types and are not limited to the illustrated device types. Computing devices 102 can comprise any type of device with one or multiple processors 104 operably connected to an input/output interface 106 and memory 108, e.g., via a bus 110. Computing devices 102 can include personal computers such as, for example, desktop computers 102a, laptop computers 102b, tablet computers 102c, telecommunication devices 102d, personal digital assistants (PDAs) 102e, electronic book readers, wearable computers, automotive computers, gaming devices, etc. Computing devices 102 can also include business or retail oriented devices such as, for example, server computers, thin clients, terminals, and/or work stations. In some examples, computing devices 102 can include, for example, components for integration in a computing device, appliances, or other sorts of devices.

In some examples, some or all of the functionality described as being performed by computing devices 102 may be implemented by one or more remote peer computing devices, a remote server or servers, or a cloud computing resource. In some examples, a computing device 102 may comprise an input port to receive a collection of sentences with syntactic dependency trees. Computing device 102 may further comprise one or multiple processors 104 to access a database that includes nested events, and assign probabilities or scores to syntactic trees annotated with semantic annotations. Such assignment may be based, at least in part, on the sentences and the nested events, for example.

In some examples, one or multiple processors 104 may be configured to train a statistical model that assigns the probabilities or the scores to the syntactic trees with semantic annotations. One or multiple processors 104 may be configured to generate an event table based, at least in part, on the statistical model. The event table may comprise two or more inter-related events each categorized by type, cause, and theme, for example. One or multiple processors 104 may be configured to determine emission parameters and/or transition parameters for a joint model of (i) the syntactic trees and (ii) semantic trees by maximizing likelihoods of the syntactic trees. To take into account the information from the database, the likelihood of the semantic trees may be augmented by compatibility scores with the database that includes the nested events.

In some examples, as shown regarding device 102d, memory 108 can store instructions executable by the processor(s) 104 including an operating system (OS) 112, a machine learning module 114, and programs or applications 116 that are loadable and executable by processor(s) 104. The one or more processors 104 may include one or more central processing units (CPUs), graphics processing units (GPUs), video buffer processors, and so on. In some implementations, machine learning module 114 comprises executable code stored in memory 108 and is executable by processor(s) 104 to collect information, locally or remotely by computing device 102, via input/output 106. The information may be associated with one or more of applications 116. Machine learning module 114 may selectively apply any of a number of machine learning decision models stored in memory 108 (or, more particularly, stored in machine learning 114) to apply to input data.

Though certain modules have been described as performing various operations, the modules are merely examples and the same or similar functionality may be performed by a greater or lesser number of modules. Moreover, the functions performed by the modules depicted need not necessarily be performed locally by a single device. Rather, some operations could be performed by a remote device (e.g., peer, server, cloud, etc.).

Alternatively, or in addition, some or all of the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some examples, computing device 102 can be associated with a camera capable of capturing images and/or video and/or a microphone capable of capturing audio. For example, input/output module 106 can incorporate such a camera and/or microphone. Images of text, for example, may be converted to editable text and entered into a database that includes complex or nested events. Audio of speech may be converted to editable text and entered into the database that includes complex or nested events. Memory 108 may include one or a combination of computer readable media.

Computer readable media may include computer storage media and/or communication media. Computer storage media includes volatile and non-volatile, removable and non-removable media implemented in any method or technology for storage of information such as computer readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media embodies computer readable instructions, data structures, program modules, or other data in a modulated data signal, such as a carrier wave, or other transmission mechanism. As defined herein, computer storage media does not include communication media. In various examples, memory 108 is an example of computer storage media storing computer-executable instructions. When executed by processor(s) 104, the computer-executable instructions configure the processor(s) to, among other things, receive one or more syntactic dependency trees, access a database that includes nested events, and generate an event table based, at least in part, on (i) the one or more syntactic dependency trees, and (ii) the nested events, wherein the generated event table includes one or more nested relationships.

In various examples, an input device of input/output (I/O) interfaces 106 can be a direct-touch input device (e.g., a touch screen), an indirect-touch device (e.g., a touch pad), an indirect input device (e.g., a mouse, keyboard, a camera or camera array, etc.), or another type of non-tactile device, such as an audio input device.

Computing device(s) 102 may also include one or more input/output (I/O) interfaces 106 to allow the computing device 102 to communicate with other devices. Input/output (I/O) interfaces 106 can include one or more network interfaces to enable communications between computing device 102 and other networked devices such as other device(s) 102. Input/output (I/O) interfaces 106 can allow a device 102 to communicate with other devices such as user input peripheral devices (e.g., a keyboard, a mouse, a pen, a game controller, a voice input device, a touch input device, gestural input device, and the like) and/or output peripheral devices (e.g., a display, a printer, audio speakers, a haptic output, and the like).

Figure 2:
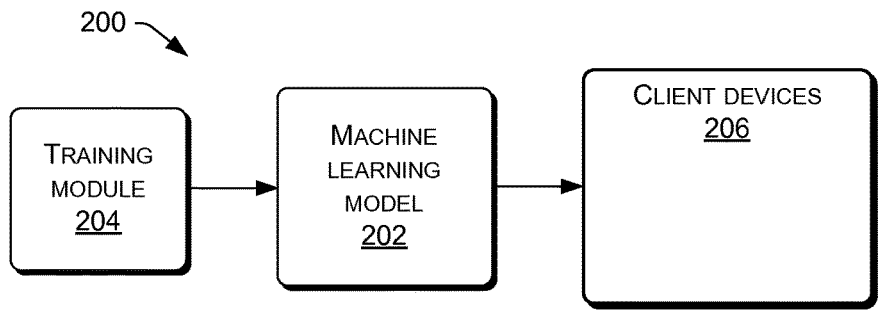
FIG. 2 is a block diagram of an example machine learning system.

FIG. 2 is a block diagram of a machine learning system 200, according to various examples. Machine learning system 200 includes a machine learning model 202, a training module 204, and a number of client devices 206, any of which may access one or more databases. Machine learning model 202 may receive training data from offline training module 204. For example, training data can include data from a population, such as a population of elements in a database. Data from the population may be used to train machine learning model 202. Subsequent to such training, machine learning model 202 can be employed in client devices 206. Thus, for example, training using the data from the population for offline training can act as initial conditions for the machine learning model. Other techniques for training, such as those involving virtual evidence, described below, may be used.

Figure 3:
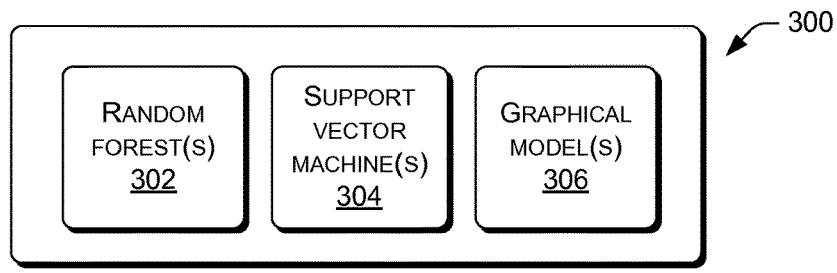
FIG. 3 is a block diagram of example machine learning models.

FIG. 3 is a block diagram of a machine learning model 300, according to various examples. Machine learning model 300 may be the same as or similar to machine learning model 202 shown in FIG. 2. Machine learning model 300 includes any of a number of functional blocks, such as random forest block 302, support vector machine block 304, and graphical models block 306. Random forest block 302 can include an ensemble learning method for classification that operates by constructing decision trees at training time. Random forest block 302 can output the class that is the mode of the classes output by individual trees, for example. Random forest block 302 can function as a framework including several interchangeable parts that can be mixed and matched to create a large number of particular models. Constructing a machine learning model in such a framework involves determining directions of decisions used in each node, determining types of predictors to use in each leaf, determining splitting objectives to optimize in each node, determining methods for injecting randomness into the trees, and so on.

Support vector machine block 304 classifies data for machine learning model 300. Support vector machine block 304 can function as a supervised learning model with associated learning algorithms that analyze data and recognize patterns, used for classification and regression analysis. For example, given a set of training data, each marked as belonging to one of two categories, a support vector machine training algorithm builds a machine learning model that assigns new training data into one category or the other.

Graphical models block 306 functions as a probabilistic model for which a graph denotes conditional dependence structures between random variables. Graphical models provide algorithms for discovering and analyzing structure in distributions and extract unstructured information. Applications of graphical models include information extraction, speech recognition, computer vision, and decoding of low-density parity-check codes, just to name a few examples.

Figure 4A:
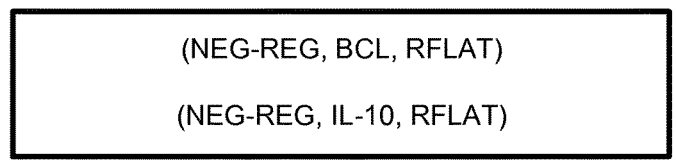
FIG. 4A illustrates example simple events.
Figure 4B:
FIG. 4B illustrates an example complex event.

FIGS. 4A and 4B illustrate example events (e.g., relationships) that arise from an example sentence "BCL stimulates inhibition of RFLAT by IL-10". BCL, RFLAT, and IL-10 are terms that may be found in biomedical articles, for example. "BCL stimulates inhibition of RFLAT by IL-10" may be a natural language sentence in a database.

FIG. 4A includes two binary relation events (NEG-REG, BCL, RFLAT) and (NEG-REG, IL-10, RFLAT) that may arise from extraction from text. NEG-REG represents a negative regulation (e.g., inhibition). In each event, the first term is the type of event, the second term is the cause, and the third term is the theme. Thus, for example, the first list event is type NEG-REG, the cause is BCL, and the theme is RFLAT. In natural language, this event may be "BCL inhibits RFLAT". Similarly, the second list event is type NEG-REG, the cause is IL-10, and the theme is RFLAT. In natural language, this event may be "IL-10 inhibits RFLAT". Both events are binary and not complex.

On the other hand, FIG. 4B includes an event (POS-REG, BCL, (NEG-REG, IL-10, RFLAT)) that may arise from extraction from text, or could be directly authored by a domain expert. POS-REG represents a positive regulation (e.g., stimulates). As explained for the notation in FIG. 4A, the first term is the type of event, the second term is the cause, and the third term is the theme. Thus, for example, the event is type POS-REG, the cause is BCL, and the theme is RFLAT. In natural language, this event may be "BCL stimulates inhibition of RFLAT by IL-10". Thus, the event listed in FIG. 4B is a representation of the example sentence "BCL stimulates inhibition of RFLAT by IL-10".

The event in FIG. 4B is complex and nested and is thus able to fully represent the example sentence. A nested event may be a relation between relations, or interdependency among two or more relations. For example, the event inside the inner parentheses is an element of the event enclosed by the outer parentheses. For example, the sentence discloses contextual information, e.g., BCL regulates RFLAT by stimulating the inhibitive effect of IL-10, and likewise the inhibition of RFLAT by IL-10 is controlled by BCL. Such context-specific knowledge may be important in many fields of study, such as translational medicine. On the other hand, the two non-nested events listed in FIG. 4A do not convey the full meaning of the example sentence. A practitioner relying on the events listed in FIG. 4A, and not aware of the nested event in FIG. 4B, nor the example sentence itself, may perform a targeted therapy that tries to suppress RFLAT by inducing either BCL or IL-10, without taking into account the interdependency between BCL or IL-10.

Figures 5, 6:
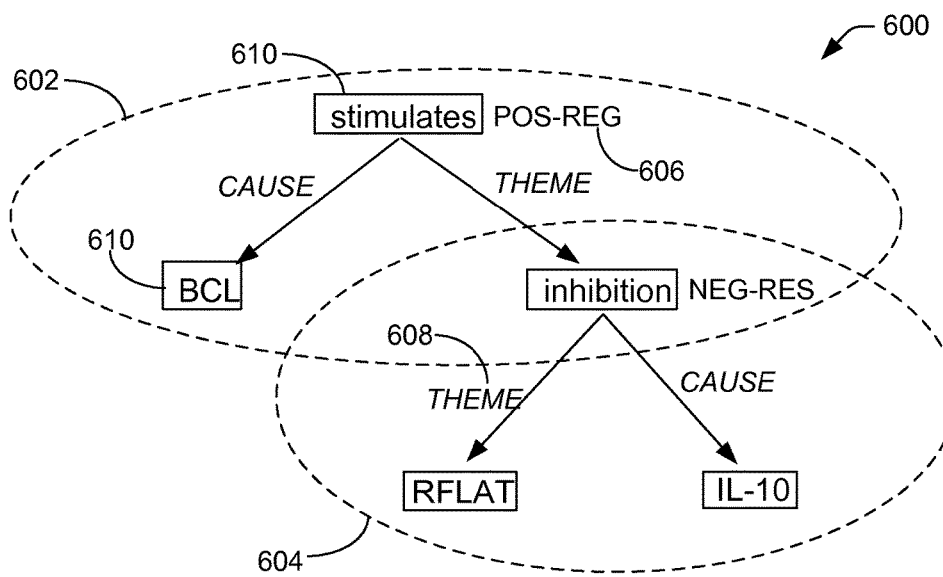
FIG. 5 is an example event table that includes annotations.
FIGS. 6 and 7 illustrate example annotated syntactic trees.

FIG. 5 is an example event table 500 that includes annotations. The table includes an ID column comprising identification (ID) for individual rows of the table. The table also includes columns for TYPE, CAUSE, THEME, and TRIGGER. For illustrative purposes, table 500 includes elements based on the example sentence "BCL stimulates inhibition of RFLAT by IL-10". Rows 1-3 describe triggers BCL, RFLAT, and IL-10, respectively, which are of TYPE "Protein". Rows 4 and 5 describe events (e.g., relations), which are complex. In particular, row 4 describes an event involving BCL (ID=T1) and the event of row 5 (ID=E2). In other words, row 4 describes a relation of a relation, which is a nested structure (e.g., the THEME argument of E1 is an event E2). Row 5 describes an event involving IL-10 (ID=T3) and RFLAT (ID=T2), and can be written out as "IL-10 inhibits RFLAT." Using this expression from row 5 (ID=E2) to write out the event of row 4 gives "BCL stimulates (the IL-10 inhibition of RFLAT)," where the phrase in the parentheses is from row 5 (ID=E2).

FIG. 6 illustrates an example annotated syntactic tree 600. For illustrative purposes, syntactic tree 600 is based on the example sentence "BCL stimulates inhibition of RFLAT by IL-10". As discussed above, the example sentence, and thus syntactic tree 600 comprises a nested (e.g., complex) event. In particular, such a nested event includes a first event (e.g., relation) 602 and a second event (e.g., relation) 604. Second event 604 is nested within first event 602. Similar to or the same as that depicted in table 500, described above, first event 602 involves BCL and event 604. In other words, first event 602 is a relation of a relation, which is a nested structure (e.g., the THEME argument of first event 602 is second event 604. Second event 604 is an event involving IL-10 and RFLAT, and can be written out as "IL-10 inhibits RFLAT." Using this expression to write out first event 602 gives "BCL stimulates (the IL-10 inhibition of RFLAT)," where the phrase in the parentheses is from second event 604.

Syntactic tree 600 includes annotations, which comprise TYPE labels 606 (included in FIG. 6 as all caps, non-italicized) and transition parameters 608 (included in FIG. 6 as all caps, italicized). For example, TYPE labels 606 of syntactic tree 600 include POS-REG and NEG-RES. Edge labels 608 of syntactic tree 600 include CAUSE and THEME (multiple occurrences). Syntactic tree 600 includes words (e.g., nodes) 610 such as, for example, "stimulates", "BCL", "inhibition", "RFLAT", and "IL-10".

Figure 7:
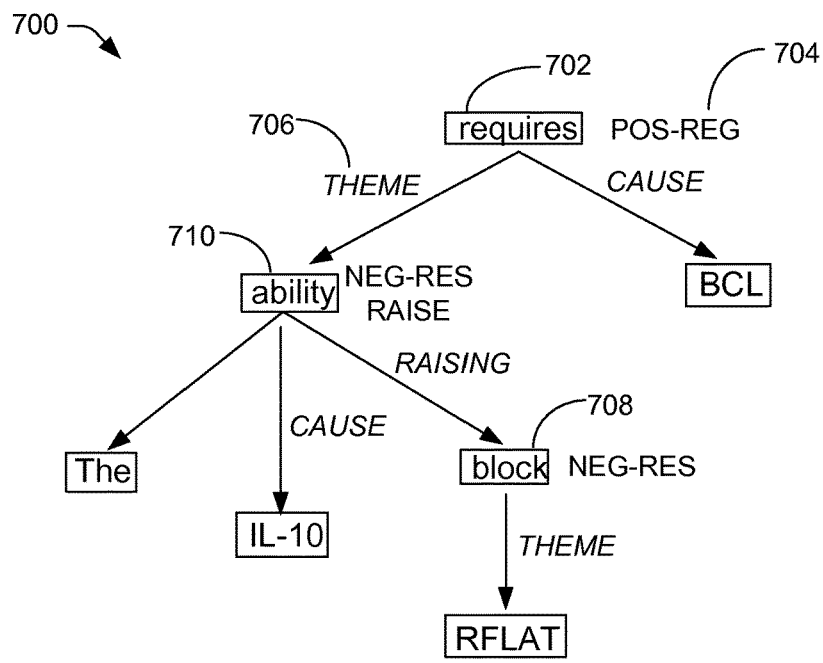

FIG. 7 illustrates an example annotated syntactic tree 700. For illustrative purposes, syntactic tree 700 is based on the example sentence "BCL stimulates inhibition of RFLAT by IL-10". As discussed above, the example sentence, and thus syntactic tree 700 comprises a nested (e.g., complex) event.

Syntactic tree 700 may represent a sentence that has a meaning similar to or the same as that of a sentence represented by syntactic tree 600, though the wording is different. For example, syntactic tree 600 may be read as "BCL stimulates inhibition of RFLAT by IL-10," whereas syntactic tree 700 may be read as "The ability of IL-10 to block RFLAT requires BCL."

For simple sentences such as that represented by syntactic tree 600, a complex event may be represented by a semantic parse using only basic states. In general, however, syntax and semantics may diverge from one another. For example, the word at the root 702, "requires" triggers the top POS-NEG event 704 that has a THEME argument 706 triggered by word "block" 708. The word "ability" 710, however, is between "requires" and "block". Similarly, the word "ability" 710 is between "IL-10" and "block". Additionally, a mismatch may arise from errors in the syntactic parse. In such cases, the correct semantic parse may no longer be represented by basic states alone. Accordingly, an argument state RAISING may be introduced that, if assigned to a dependency, would require that parent and child nodes be assigned the same basic event state. A corresponding RAISE version for each non-null event state may be used to indicate that the word derives its basic state from RAISING of a child. In some implementations, RAISING may be related, but not identical, to type raising in combinatorial categorical grammar (CCG) and other grammars.

Figure 8:
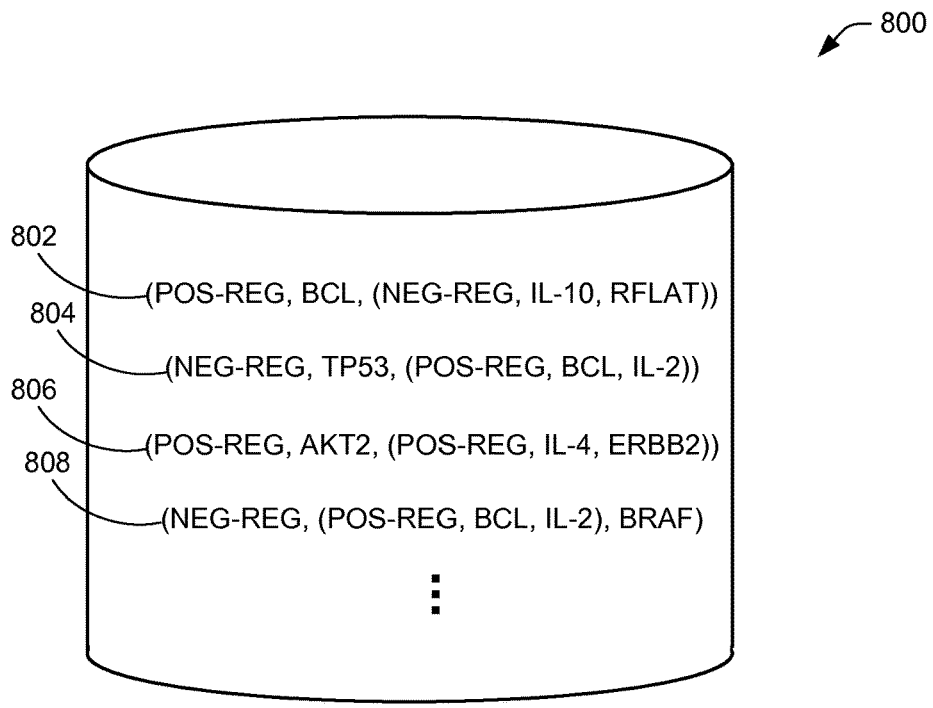
FIG. 8 is a schematic diagram of an example database that includes complex events.

FIG. 8 is a schematic diagram of an example database 800 that includes complex events. Database 800 may be associated with biomedical research articles and/or journals, for example. However, examples and techniques described herein may be applied to any fields of study, and claimed subject matter is not limited in this respect. As examples of complex events, database 800 includes events 802-808. Event 802 includes a nested event comprising NEG-REG, IL-10, RFLAT. Event 804 includes a nested event comprising POS-REG, BCL, IL-2. Event 806 includes a nested event comprising POS-REG, IL-4, ERBB2. Event 808 includes a nested event comprising POS-REG, BCL, IL-2.

In various examples, a process may identify biological events (or events of other fields of study) from text, including the trigger words and arguments in a database, such as database 800. In particular implementations, nine event types may be involved in the process. Examples of event types may include relatively simple event types such as Expression and Transcription, that may only have one THEME argument. Event type binding may have more than one THEME argument. Event type regulations may have both THEME and CAUSE arguments. Protein annotations (e.g., for identifying biological events) may be provided as input.

The process for identify events from text may involve semantic parsing performed by GUSPEE. A portion of GUSPEE may include a tree hidden Markov model (HMM) that extracts events from a sentence by annotating its syntactic dependency tree with event and argument states. In training, GUSPEE may receive as input unannotated text and a database of complex events, such as database 800, and learns the tree HMM using EM, guided by grounded learning from the database via virtual evidence, as described below.

In some examples, GUSPEE may generate a table that includes annotated events, some of which are complex. The annotated events in the table comprise information in structured form that represents text in databases. Such information in the form of tables may be used to improve search experiences in various fields of study, for example. Such information may also be used to derive new information, using inference.

In some examples, GUSPEE involves modelling annotations as latent variables and incorporating a prior that favors semantic parses containing known events. Problem formulation defines t be a syntactic dependency tree for a sentence, with nodes $n_i$ and dependency edges $d_{i,j}$ ($n_j$ is a child of $n_i$). A semantic parse of t is an assignment z that maps each node to an event state and each dependency to an argument state. The semantic state of a protein word, for example, is fixed to that protein annotation. Basic event states may include nine event types and NULL (signifying a non-event). Basic argument states are THEME, CAUSE, and NULL.

GUSPEE models z; t by a tree HMM:

$$P_\theta(z,t) = \Pi P_{EMIT}(t_m|z_m,\theta) \circ P_{TRANS}(z_m|z_{\pi(m)},\theta) \qquad \text{Eqn. 1}$$

where $\theta$ are emission and transition parameters, m ranges over the nodes and dependency edges of the tree, and $\pi(n_j)=d_{i,j}$ and $\pi(d_{i,j})=n_i$. Here, $\pi$ indicates parent of a node. Such a formulation implicitly assumes a fixed underlying directed tree, while the words and dependencies may vary.

Semantic parsing finds the most probable semantic assignment given the dependency tree:

$$z^* = \arg\max \log P_\theta(z|t) = \arg\max \log P_\theta(z,t) \qquad \text{Eqn. 2}$$

In training, GUSPEE takes as input a set of complex events (database K) and syntactic dependency trees (unannotated text T), and maximizes the likelihood of T augmented by virtual evidence $\varphi_K(z)$ (e.g., applying weighting factors).

$$\theta^* = \arg\max \log P_\theta(T|K) = \arg\max \Sigma \log \Sigma P_\theta(z,t) \circ \varphi_K(z). \qquad \text{Eqn. 3}$$

In some examples, virtual evidence, which is explained in further detail below, is analogous to a Bayesian prior, but may apply to variable states rather than model parameters.

In some examples, GUSPEE uses log-linear models for emission and transition probabilities and trains using feature-rich EM. The features may comprise, for example:

Word emission ||[lemma=l; $z_m$=n];
Dependency emission ||[dependency=d; $z_m$=e] where e not [ϵ{NULL, RAISE};
Transition ||[zm=a; z(m)=b] where a, b not[ϵ{NULL, RAISE}, wherein the symbol "||" is an indicator function to indicate there may be a different feature for each setting of the expression inside the following bracket.

To modulate model complexity, GUSPEE may impose a standard $L_2$ prior on weights and include the following features with fixed weights:

$W_{NULL}$: apply to NULL states;
$W_{RAISE-P}$: apply to protein RAISING;
$W_{RAISE-E}$: apply to event RAISING.

Among the advantages of a feature-rich representation is flexibility in feature engineering. Here, NULL and RAISE may be removed from dependency emission and transition features, so that NULL and RAISE may be individually regulated.

In some examples, grounded learning in GUSPEE may incorporate virtual evidence $\varphi_K(z)$, which favors the z's containing known events in K and penalizes those containing unknown events. Such a process may use an approach that identifies events in z and comparing them with events in K. But such an approach may not be robust because individual events and mentions may be fragmental and incomplete. An approach that requires matching an event in full may miss partial matches that still convey valuable supervision. For example, proteins provided as input may be mapped to event arguments a priori. Matching sub-events with only one protein argument may be too noisy without direct supervision on triggers. Thus, for example, it may be beneficial to match minimum sub-events with two protein arguments.

In some examples, complex events in K may be preprocessed to identify minimum logical forms containing two protein arguments from individual complex events, where arguments not directly leading to either protein are skipped. For example, the complex event in of FIG. 4B may generate three sub-events: (NEG-REG, IL-10, RFLAT), (POS-REG, BCL, (NEG-REG, −, RFLAT)), (POS-REG, BCL, (NEG-REG, IL-10, −)), where "−" signifies under-specification. Such a set of sub-events is labelled S(K).

Similarly, given a semantic parse z, for every protein pair in z, for example, the minimum semantic parse sub-tree spanning the two proteins (of individual protein pairs) may be converted into a canonical logical form and compared to elements in S(K). A minimum sub-tree that contains NULL, either in an event or argument state, signifies a non-event and may be ignored. Otherwise, the canonical form may be derived by collapsing RAISING states. For example, in both syntactic trees 600 and 700, the minimum sub-tree spanning proteins IL-10 and RFLAT may be converted into the same logical form of (NEG-REG, IL-10, RFLAT). Such a set of logical forms is labelled E(z).

Formally, virtual evidence in GUSPEE comprises:

$$\varphi_K(z) = \exp \Sigma \sigma(e, K)$$

where $\sigma(e, K) = \kappa$ for $e \in S(K)$ and
$\sigma(e, K) = -\kappa$ for $e \text{ not}[\in S(K)]$ In distant supervision where z is simply a binary relation (e.g., not complex or nested), it may be trivial to evaluate $\varphi_K(z)$. In GUSPEE, however, z is a semantic parse and evaluating E(z) and $\sigma(e, K)$ may involve a global factor that does not decompose into local dependencies as the tree HMM $P_\theta(z, t)$. Such a case may be intractable.

To render learning tractable, the local event and argument states may be augmented so that the local event and argument states contain sufficient information for evaluating $\varphi_K(z)$. Specifically, the semantic state $z(n_i)$ represents not only the semantic assignment to $n_i$ (e.g., a NEG-REG event trigger), but also the set of (possibly incomplete) sub-events in the sub-tree under $n_i$. This may be accomplished by representing semantic paths from $n_i$ to proteins in the sub-tree. For example, for syntactic tree 600, the augmented state of "inhibition" may be (NEG-REG→THEME→RFLAT, NEG-REG→CAUSE→IL-10). To facilitate canonicalization and sub-event comparison, a path containing NULL may be skipped, and RAISING may be collapsed. Thus, for example, for syntactic tree 700, the augmented state of "ability" may become (NEG-REG→THEME→RFLAT, NEG-REG!→CAUSE→IL-10).

With such augmented states, −K(z) may decompose into local factors. For a particular example, proteins under $n_i$ may be known a priori, as well as children. Semantic paths from $n_i$ to proteins may thus be computed by imposing consistency constraints for individual children. Namely, for child $n_j$ that contains protein p, the semantic path from $n_i$ top may result by combining $z(n_i)$, $z(d_{i,j})$, and the semantic path from $n_j$ to p. The minimum sub-events spanning two proteins under $n_i$, if any, may be derived from the semantic paths in the augmented state. If both proteins come from the same child $n_j$, the pair need not be considered at $n_i$, because their minimum spanning sub-event, if any, may be under $n_j$ and thus already factored in.

The number of augmented states is labelled $O(s^p)$, and the number of sub-event evaluations is labelled $O(sp^2)$, where s is the number of distinct semantic paths, and p is the number of, for example, proteins in the sub-tree. In some example approaches, s and p may be constrained to reasonable ranges to make computation efficient.

Considering s, the number of semantic paths may be theoretically unbounded since a path may be arbitrarily long. However, semantic paths contained in a database event may be bounded in length and may be pre-computed from the database. Longer paths may be represented by a special dummy path signifying that the paths would not match any database events. Similarly, certain sub-paths would not occur in database events. For example, simple events may not take events as arguments, so paths containing sub-paths such as Expression→Transcription may also be illegitimate and may be represented by a special dummy path. In some implementations, for regulation events that include other regulation events as arguments, semantics may be compressed into a single regulation event. For example, POS-REG→NEG-REG is semantically equivalent with NEG-REG, because the collective effect of a positive regulation on top of a negative regulation is a negative regulation. Therefore, when evaluating a semantic path from $n_i$ to a protein, for example, during dynamic programming, consecutive regulation events may be collapsed in a child path, if any. Such an approach may further reduce the length of semantic paths to at most three (regulation-regulation-simple event-protein).

In some cases, p may be initially bounded, though p may be relatively large. For example, a sentence containing many proteins (e.g., large p), may arise from a conjunction of proteins, as in "TP53 regulates many downstream targets such as ABCB1, AFP, APC, ATF3, BAX". All proteins in the conjunct may play a similar role in their respective events, such as THEME in the above example among "ABCB1, AFP, APC, ATF3, BAX", and so the proteins share the same semantic paths. Therefore, prior to learning, sentences may be preprocessed to condense each conjunct into a single effective protein node.

Figure 9:
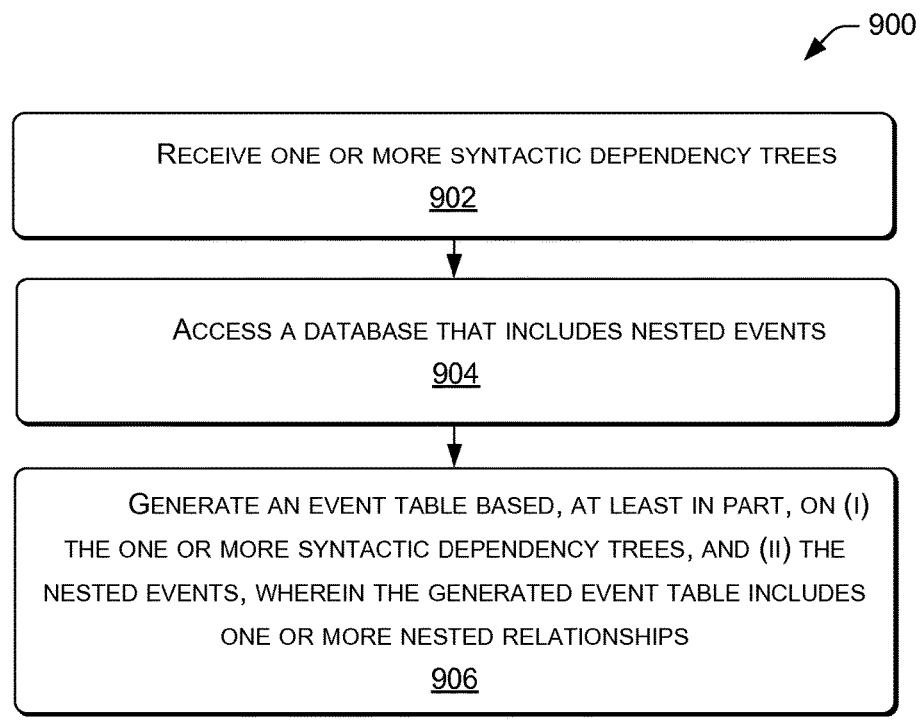
FIG. 9 is a flow diagram of an example semantic parsing process.

FIG. 9 is a flow diagram of an example semantic parsing process 900 that may be performed by a machine learning system. For example, process 900 may comprise GUSPEE or other techniques and may be performed by computing device 102, illustrated in FIG. 1. At block 902, the machine learning system may receive one or more syntactic dependency trees. For example, the syntactic dependency trees may be derived from unannotated text.

At block 904, the machine learning system may access a database that includes nested events. Such a database may be similar to or the same as database 800, for example. In some cases, the database may include a plurality of events.

At block 906, the machine learning system may generate an event table based, at least in part, on (i) the one or more syntactic dependency trees, and (ii) the nested events. The generated event table may include one or more nested relationships. In some implementations, generating the event table may be based, at least in part, on the unannotated text in the syntactic dependency trees. In some examples, generating the event table may comprise generating a probability distribution as a function of (i) one or more of the nested events of the database and (ii) latent variables, and determining a set of values of the latent variables that maximize the probability distribution. Such a process may be expressed by Equations 1 and 2, described above, for example. In some implementations, generating the event table may further comprise generating additional probability distributions that are respectively functions of different sets of (i) the one or more of the nested events of the database and (ii) the latent variables, and biasing each of the additional probability distributions with respective weighting factors. Such a process may be expressed by Equation 3, described above, for example.

The flow of operations illustrated in FIG. 9 is illustrated as a collection of blocks and/or arrows representing sequences of operations that can be implemented in hardware, software, firmware, or a combination thereof. The order in which the blocks are described is not intended to be construed as a limitation, and any number of the described operations can be combined in any order to implement one or more methods, or alternate methods. Additionally, individual operations may be omitted from the flow of operations without departing from the spirit and scope of the subject matter described herein. In the context of software, the blocks represent computer-readable instructions that, when executed by one or more processors, configure the processor(s) to perform the recited operations. In the context of hardware, the blocks may represent one or more circuits (e.g., FPGAs, application specific integrated circuits—ASICs, etc.) configured to execute the recited operations.

Any routine descriptions, elements, or blocks in the flows of operations illustrated in FIG. 9 may represent modules, segments, or portions of code that include one or more executable instructions for implementing specific logical functions or elements in the routine.

EXAMPLE CLAUSES

Example A, a system comprising: one or more processors; and memory storing instructions that, when executed by the one or more processors, configure the one or more processors to perform operations comprising: receiving one or more syntactic dependency trees; accessing a database that includes nested events; and generating an event table based, at least in part, on (i) the one or more syntactic dependency trees and (ii) the nested events, wherein the generated event table includes one or more nested relationships.

Example B, the system as example A recites, wherein the syntactic dependency trees are derived from unannotated text, and wherein generating the event table is based, at least in part, on the unannotated text.

Example C, the system as example A recites, wherein generating the event table further comprises: generating a probability distribution as a function of (i) one or more of the nested events of the database and (ii) latent variables; and determining a set of values of the latent variables with maximum probability.

Example D, the system as example C recites, wherein generating the event table further comprises: generating additional probability distributions that are respectively functions of different sets of (i) one or more of the nested events of the database and (ii) the latent variables; and biasing each of the additional probability distributions with respective weighting factors.

Example E, the system as example D recites, wherein the respective weighting factors comprise virtual evidence.

Example F, the system as example A recites, wherein the event table comprises two or more nested events.

Example G, the system as example A recites, wherein the event table is generated using distant supervision.

Example H, a computing device comprising: an input port to receive a collection of sentences with syntactic dependency trees; and a processor to: access a database that includes nested events; and based, at least in part, on the sentences and the nested events, assign probabilities or scores to syntactic trees annotated with semantic annotations.

Example I, the computing device as example H recites, wherein the processor is configured to: train a statistical model that assigns the probabilities or the scores to the syntactic trees annotated with the semantic annotations.

Example J, the computing device as example I recites, wherein the processor is configured to: generate an event table based, at least in part, on the statistical model.

Example K, the computing device as example J recites, wherein the event table comprises two or more nested events.

Example L, the computing device as example H recites, wherein the processor is configured to: determine emission parameters and/or transition parameters for a joint model of (i) the syntactic dependency trees and (ii) semantic trees by maximizing likelihoods of the syntactic dependency trees.

Example M, the computing device as example J recites, wherein the likelihood of the syntactic dependency trees with the semantic annotations is augmented by the database that includes the nested events.

Example N, a Computer-readable storage media of a client device storing computer-executable instructions that, when executed by one or more processors of the client device, configure the one or more processors to perform operations comprising: receiving one or more syntactic dependency trees; accessing a database comprising a plurality of events that include nested relationships; and based, at least in part, on the nested relationships, generating one or more syntactic trees annotated with semantic annotations.

Example O, the computer-readable storage medium as example N recites, the operations further comprising: generating an event table representing the one or more syntactic trees annotated with the semantic annotations, wherein the generated event table includes one or more nested relationships.

Example P, the computer-readable storage medium as example N recites, the operations further comprising: counting the number of times that a particular syntactic tree annotated with particular semantic annotations is generated.

Example Q, the computer-readable storage medium as example N recites, wherein the one or more syntactic dependency trees are derived from unannotated text.

Example R, the computer-readable storage medium as example N recites, the operations further comprising: receiving a search query relating to a knowledge domain of the database in a natural or a formal language; and retrieving answers for the search query based, at least in part, on (i) information in the database, and (ii) a derived semantic representation of the query.

Example S, the computer-readable storage medium as example N recites, the operations further comprising: receiving a search query comprising a nested search term; and comparing the search query with the one or more syntactic trees annotated with the semantic annotations.

Example T, the computer-readable storage medium as example N recites, wherein the one or more syntactic trees annotated with the semantic annotations is generated using distant supervision.

Although the techniques have been described in language specific to structural features and/or methodological acts, it is to be understood that the appended claims are not necessarily limited to the features or acts described. Rather, the features and acts are described as example implementations of such techniques.

Unless otherwise noted, all of the methods and processes described above may be embodied in whole or in part by software code modules executed by one or more general purpose computers or processors. The code modules may be stored in any type of computer-readable storage medium or other computer storage device. Some or all of the methods may alternatively be implemented in whole or in part by specialized computer hardware, such as FPGAs, ASICs, etc.

Conditional language such as, among others, "can," "could," "might" or "may," unless specifically stated otherwise, are used to indicate that certain examples include, while other examples do not include, the noted features, elements and/or steps. Thus, unless otherwise stated, such conditional language is not intended to imply that features, elements and/or steps are in any way required for one or more examples or that one or more examples necessarily include logic for deciding, with or without user input or prompting, whether these features, elements and/or steps are included or are to be performed in any particular example.

Conjunctive language such as the phrase "at least one of X, Y or Z," unless specifically stated otherwise, is to be understood to present that an item, term, etc. may be either X, or Y, or Z, or a combination thereof.

Many variations and modifications may be made to the above-described examples, the elements of which are to be understood as being among other acceptable examples. All such modifications and variations are intended to be included herein within the scope of this disclosure.

What is claimed is:

1. A system comprising:
   one or more processors; and
   memory storing instructions that, when executed by the one or more processors, configure the one or more processors to perform operations comprising:
      receiving one or more syntactic dependency trees;
      accessing a database, wherein the database comprises a first event and a second event, wherein the first event comprises a first event type, a first cause entity, and a first theme entity, and wherein the second event comprises a nested structure including the first event, wherein the second event comprises a second event type, a second cause entity, and a second theme entity, wherein one of the second cause entity and the second theme entity is the first event, and wherein an event type comprises an action by a cause entity, and wherein the cause entity comprises at least one causal entity, and a theme entity comprises at least one resultant entity caused by the at least one causal entity through imposing the event type;
      performing semantic parsing on the one or more syntactic dependency trees to form one or more annotated dependency trees, wherein the semantic parsing further comprises:
         mapping each node of a plurality of nodes in the one or more syntactic dependency trees to an event state based on the database, the event state comprises one of the first event type, the second event type, and a null value; and
         mapping each edge of a plurality of dependency edges in the one or more syntactic dependency trees to an argument state based on the database, the argument state comprises one of the first cause entity, the first theme entity, the second cause entity, the second theme entity, and a null value;
      extracting, by the one or more processors, the first event from the one or more annotated dependency trees;
      extracting, by the one or more processors, the second event from the one or more annotated dependency trees, wherein the second event comprises a nested structure including the first event; and
      generating, by the one or more processors, an event table, based at least in part on the first event and the second event, wherein the event table comprises:
         an event type,
         an event cause entity, and
         an event theme entity.

2. The system of claim 1, wherein the syntactic dependency trees are derived from unannotated text, and wherein generating the event table is based, at least in part, on the unannotated text.

3. The system of claim 1, wherein generating the event table further comprises:
   generating a probability distribution as a function of the nested event and latent variables; and determining a set of values of the latent variables with maximum probability.

4. The system of claim 3, wherein generating the event table further comprises:
   generating additional probability distributions that are respectively functions of different sets of the at least one nested event and the latent variables; and
   biasing each of the additional probability distributions with respective weighting factors.

5. The system of claim 4, wherein the respective weighting factors comprise virtual evidence.

6. The system of claim 1, wherein the event table comprises two or more nested events, each nested event of the two or more nested events is categorized by at least one of type, cause, or theme.

7. The system of claim 1, wherein the event table is generated using distant supervision.

8. A computing device comprising:
   an input port to receive a collection of sentences with syntactic dependency trees; and
   a processor to:
      access a database, wherein the database comprises a first event and a second event, wherein the first event comprises a first event type, a first cause entity, and a first theme entity, and wherein the second event comprises a nested structure including the first event, wherein the second event comprises a second event type, a second cause entity, and a second theme entity, wherein one of the second cause entity and the second theme entity is the first event, and wherein an event type comprises an action by a cause entity, and wherein the cause entity comprises at least one causal entity, and a theme entity comprises at least one resultant entity caused by the at least one causal entity through imposing the event type;
      perform semantic parsing on the syntactic dependency trees to form annotated syntactic trees, wherein the semantic parsing comprises:
         mapping each node of a plurality of nodes in the syntactic dependency trees to an event state based on the database, wherein the event state comprises one of the first event type, the second even type, and a null value; and
         mapping each edge of a plurality of dependency edges in the syntactic dependency trees to an argument state based on the database, wherein the argument state comprises one of the first cause entity, the first theme entity, the second cause entity, the second theme entity, and the null value; and assign, by the processor, probabilities or scores to the annotated syntactic trees based at least in part on the collection of sentences and the nested event.

9. The computing device of claim 8, wherein the processor is configured to:
train, by the processor, a statistical model that assigns the probabilities or the scores to the annotated syntactic trees.

10. The computing device of claim 9, wherein the processor is configured to:
generate, by the processor, an event table based, at least in part, on the statistical model.

11. The computing device of claim 10, wherein the event table comprises two or more nested events.

12. The computing device of claim 8, wherein the processor is configured to:
determine, by the processor, emission parameters and/or transition parameters for a joint model of the syntactic dependency trees and semantic trees by maximizing likelihoods of the syntactic dependency trees.

13. The computing device of claim 12, wherein the likelihoods of the syntactic dependency trees with semantic annotations is augmented by the database that includes the two or more nested events.

14. One or more computer storage media of a client device storing computer-executable instructions that, when executed by one or more processors of the client device, configure the one or more processors to perform operations comprising:
receiving one or more syntactic dependency trees;
accessing a database, wherein the database comprises a first event and a second event, wherein the first event comprises a first event type, a first cause entity, and a first theme entity, and wherein the second event is a nested event of the first event, wherein the second event comprises a second event type, a second cause entity, and a second theme entity, wherein one of the second cause entity and the second theme entity is the first event, and wherein an event type comprises an action by a cause entity, and wherein the cause entity comprises at least one causal entity, and a theme entity comprises at least one resultant entity caused by the cause entity through imposing the event type; and
performing semantic parsing on the one or more syntactic dependency trees to generate one or more annotated syntactic trees, wherein the semantic parsing comprises:
mapping each node of a plurality of nodes in the one or more syntactic dependency trees to an event state based on the database, wherein the event state comprises one of the first event type, the second event type, and a null value; and
mapping each edge of a plurality of dependency edges in the one or more syntactic dependency trees to an argument state based on the database, wherein the argument state comprises one of the first cause entity, the first theme entity, the second cause entity, the second theme entity, and the null value.

15. The one or more computer storage media of claim 14, the operations further comprising:
generating, by the one or more processors, an event table based on the one or more annotated syntactic dependency trees, wherein the event table comprises:
an event type,
an event cause entity, and
an event theme entity,
and wherein the event table comprises one or more nested events.

16. The one or more computer storage media of claim 14, the operations further comprising:
counting a number of times that a particular syntactic tree annotated with particular semantic annotations is generated.

17. The one or more computer storage media of claim 14, wherein the one or more syntactic dependency trees are derived from unannotated text.

18. The one or more computer storage media of claim 14, the operations further comprising:
receiving a search query relating to a knowledge domain of the database in a natural or a formal language; and
retrieving answers for the search query based, at least in part, on (i) information in the database, and (ii) a derived semantic representation of the search query.

19. The one or more computer storage media of claim 14, the operations further comprising:
receiving a search query comprising a nested search term; and
comparing the search query with the one or more annotated syntactic trees.

20. The one or more computer storage media of claim 14, wherein the one or more annotated syntactic is generated using distant supervision.

* * * * *